July 19, 1932.  G. VULTEE  1,867,786

RETRACTABLE LANDING GEAR

Filed July 28, 1930  3 Sheets-Sheet 1

INVENTOR
Gerard Vultee.
BY
ATTORNEYS.

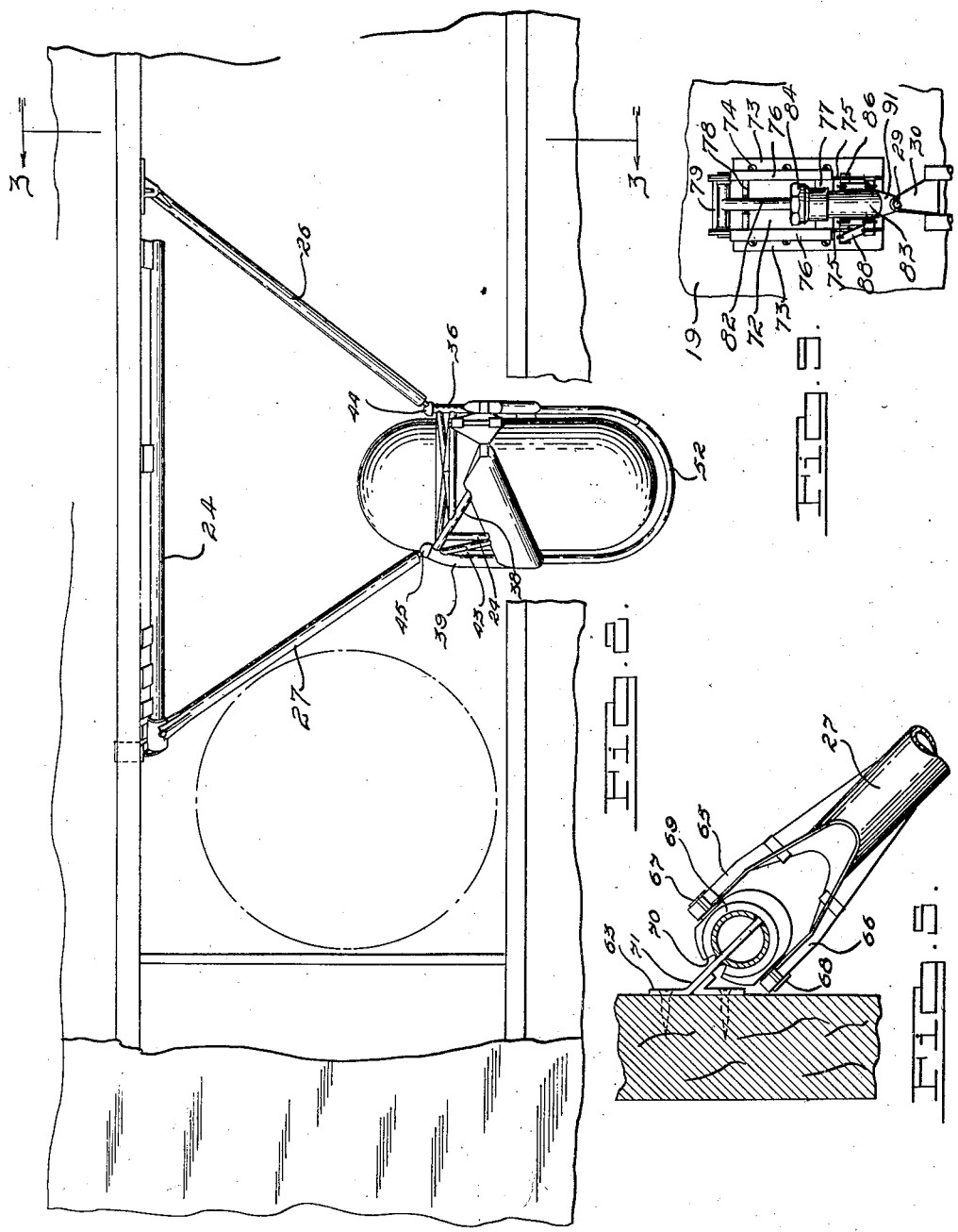

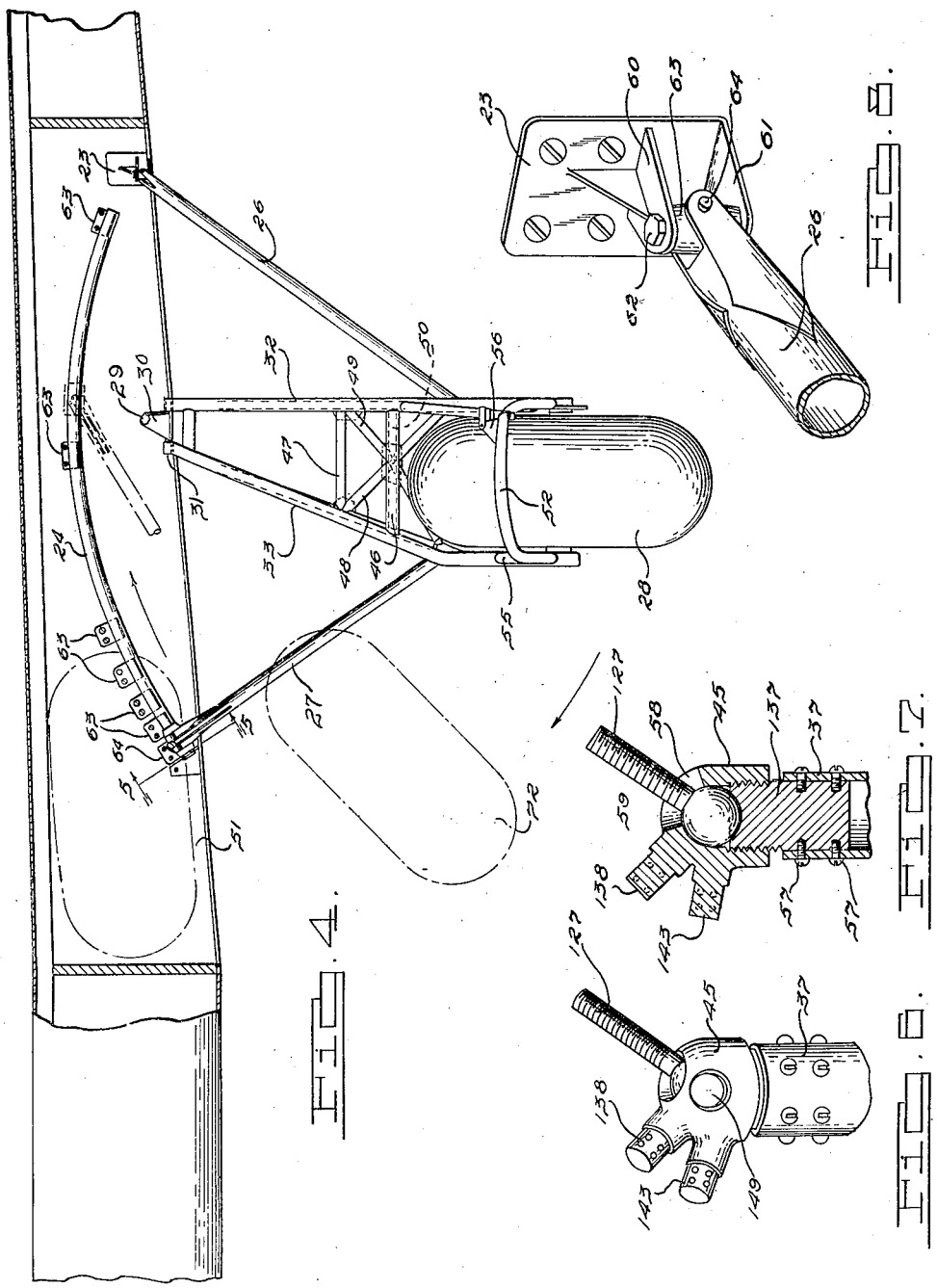

Patented July 19, 1932

1,867,786

UNITED STATES PATENT OFFICE

GERARD VULTEE, OF DETROIT, MICHIGAN

RETRACTABLE LANDING GEAR

Application filed July 28, 1930. Serial No. 471,212.

This invention relates to retractable landing gears and it has particular relation to aircraft landing gears that may be retracted in flight to reduce the structural parasite resistance and extended to proper position for landing.

One object of this invention is to provide means to retract the landing gear of an aircraft until it is within the streamline form of the vehicle, and preferably within an airfoil profile portion of the vehicle.

Another object is to provide such a landing gear in which such retraction and extension may be simply, easily and quickly accomplished in a positive manner, and which when extended will be rugged and of an inherently strong design.

Another object is to provide a landing gear which when extended has its ground contacting portion located forwardly of the center of gravity of the aircraft and forwardly of the center of pressure of the aircraft and which when retracted will move rearwardly and upwardly within the airfoil into a position between the structural elements of the airfoil, such as the spars, in such position as to necessitate the least changes in the design of the airfoil.

Another object is to provide a landing gear in which the parts are firmly braced together with the elements of the sliding pairs at right angles to each other when the landing gear is in landing position, so that the shock of landing will not set up any resultant forces acting on the parts in a manner tending to collapse the landing gear.

Another object is to provide a retractable landing gear in which the movements of parts between the retracted and the extended positions is of such a unitary nature that there will be no tendency for the parts to jam during the movement, nor will any portion of the movement require a materially sudden increase in force over any adjacent portion of the movement.

Another object is to provide a retractable landing gear that may be easily applied to usual type aircraft without great structural changes and which may be supplied as alternative optional equipment to the conventional non-retractable landing gear of usual type aircraft.

Another object is to provide a simple, positive acting and rugged retractable landing gear, having few parts, that may be relatively easily and cheaply made by simple factory production methods, not involving difficult or expensive operations.

Another object is to provide suitable shock absorbing means for such a retractable landing gear.

Numerous other objects and features of novelty will be either specifically pointed out, or will be apparent, upon reading the accompanying specification, claims and drawings, which describe and show an illustrative embodiment of this invention.

The above being among the objects of the present invention, the same consists in certain features of construction in combination with parts hereinafter described with reference to the accompanying drawings, and then claimed, having the above and other objects in view.

Like reference numerals apply to like parts throughout the various figures of the drawings, in which:

Fig. 2 is a fragmentary plan view of one of the airfoils 12 shown in Fig. 1, showing details of the construction of the landing gear.

Fig. 4 is a sectional view of the device shown in Fig. 3 taken along the line 4—4 looking in the direction indicated.

Fig. 5 is a sectional view of the device shown in Fig. 4, taken along the line 5—5 looking in the direction indicated.

Fig. 6 is an enlarged fragmentary perspective view of one type of ball and socket joint that may be used to connect the auxiliary and main struts.

Fig. 7 is a sectional view of the apparatus shown in Fig. 6 taken on a plane parallel to the paper in Fig. 6.

Fig. 8 is an enlarged fragmentary perspective view of one form of universal joint which may be used to connect an auxiliary strut to a spar.

Fig. 9 is an enlarged fragmentary view of the shock absorber and related parts showing features of construction.

Figure 1:
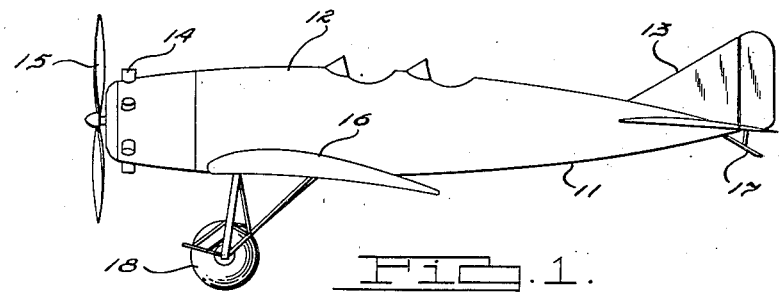
Fig. 1 is a view in elevation of an airplane with an illustrative form of the invention embodied therein.

The landing gear of an aircraft is employed only for support when resting on the ground, to permit take-off and to take the shocks of landing. When the aircraft is in flight the gear is only an added parasite resistance (of the order of 10 to 15 per cent of the whole resistance in the case of a single engine tractor airplane such as shown in Fig. 1).

It is highly desirable, therefore, both from the standpoint of economy and speed, that the landing gear be drawn within the faired or streamlined or airfoiled portion of the aircraft so that this parasite resistance may be eliminated.

This landing gear should preferably have suitable shock absorbing means.

The landing gear must, however, be rugged, and positively and quickly retracted and extended, must be light in weight, economical of space and not interfere with the structure or strength of the other portions of the aircraft. Prior devices have not been successful and have not been generally adapted because they lacked one or more of the requisities mentioned above.

This present invention is so constructed as to avoid the difficulties encountered by the prior devices and to produce a landing gear having all the useful attributes herein mentioned.

In Fig. 1 an aircraft generally designated as 11 has a fuselage 12, an empennage 13 mounted on the rear of the fuselage, a motor 14 journalling and rotating a propeller 15, mounted on the forward end of the fuselage and airfoils 16 secured at the sides of said fuselage. In order to provide means for taking off and landing this aircraft, a tail skid generally designated as 17 may be provided at the rear end of the fuselage 12, and a landing gear generally designated as 18 is secured to the airfoils 16, in a manner to be described later in considerable detail.

The landing gear generally designated as 18 is adapted to be retracted within the aerodynamic surfaces of the airfoils 16, where it will be sheltered from the relative wind, and therefore cannot add any parasite resistance to the total resistance of the plane.

Figure 3:
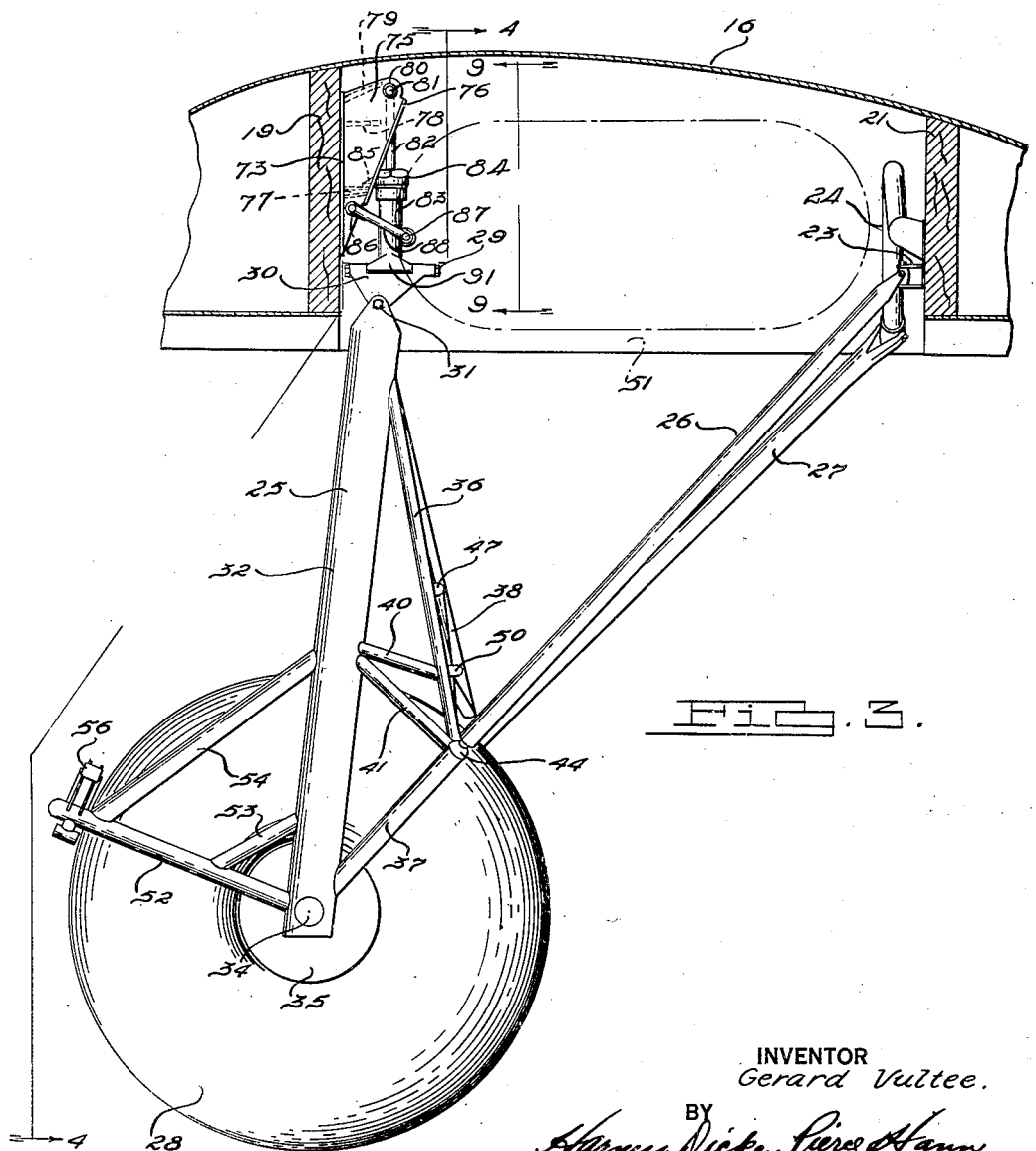
Fig. 3 is a sectional view of the device shown in Fig. 2 taken along the line 3—3 looking in the direction indicated.

As more clearly shown in Fig. 3, the airfoil 16 has a front spar 19 and a rear spar 21. These spars are the main members in the structure of the airfoil. The landing gear 18 is shown mounted on the spars 19 and 21, although the points of attachment are not of the essence of the invention, as attachment may be made to any suitable frame members.

Mounted on the front spar 19 is a bracket 72 and mounted on the rear spar is a bracket 23 and guideway 24. The landing gear is suspended from these brackets and guideway by means of struts and when in retracted position folds up between the spars by movement controlled by said guideway.

A main strut generally designated as 25 and two auxiliary struts 26 and 27 form a tripod which provides three point suspension for a ground contacting portion 28 in the form of a pneumatic rubber tire.

The bracket 72 is provided with longitudinally disposed flanges 73 and is rigidly secured thereby to the spar 19 by any suitable means such as screws 74 shown in Fig. 9. The bracket has two parallel flanges 75 disposed perpendicular to the strut and tapering inwardly and downwardly from a wide upper end to a narrow lower end. The parallel flanges 75 have their terminal edges 76 bent at right angles to the plane of their faces to provide a reinforced edge, and the flanges are further braced throughout their extent by reinforcing ribs 77, 78 and 79.

The reinforcing ribs 77, 78 and 79 are horizontally disposed plate-like members secured along their rear edges to the base plate of bracket 72 and along both sides to the parallel flanges 75. The members 77 and 78 also act as stop members, as will be pointed out later.

A pair of transversely disposed axially aligned wrist pin bearing holes 80 are provided at the top of the flanges 75 and a conventional shock absorber element is journaled thereto by means of a wrist pin 81 passing through the holes 80.

While either the cylinder or the piston rod of the conventional strut type shock absorber may be mounted on wrist pin 81, for purpose of illustration I have shown one end of a piston rod 82 so mounted. The other end of the rod extends into the cylinder 83 wherein it is capable of limited sliding movement modified and resisted by the shock absorbing means, which may be hydraulic, pneumatic and/or resilient in nature, utilizing any suitable means known to the prior art.

The cylinder 83 has a stuffing box 84 containing the usual gland and packing (not shown). On the side of the member 84 disposed toward the bracket 72 is an integral outstanding ear 85 adapted to contact the members 77 and 78 upon extreme downward and upward movement of the cylinder 83 respectively, and to limit the motion of the cylinder thereby.

The flanges 75 have at their lower ends a bearing 86 similar to bearing 80 and the cylinder 83 is provided with similar bearing means 87. A link member 88, composed of several compression members 89 secured together by a plate 90, is swiveled to the bearing means 86 and 87 and provides a guide means for the cylinder 83, holding it in spaced relation adjacent the bracket 72 at every point in its movement between stop members 77 and 78.

The bottom of the cylinder 83 is provided with a swivel bearing 91. Pivoted to the bearing 91 by means of a pivot pin 29 is an intermediate member 30, and pivoted to the member 30 by means of a pivot pin 31 is the main strut 25. The axes of the pins 29 and 31 are at right angles to each other so that the parts 91, 29, 30 and 31 form universal joint means, universally pivoting the main strut 25 to the spar 19 through the shock absorber and bracket.

Should no shock absorber be desired, or should another location for the shock absorber be chosen, bearing 89 may be mounted on a bracket rigidly secured to strut 19.

The main strut 25 may be in the form of a truss, as shown best in Figs. 3 and 4. Members 32 and 33 form the main compression members, and in the embodiment shown in the drawings, rigidly support an axle 34 adjacent their lower ends. A wheel 35 is journalled on the axle 34 which carries the ground contacting tire 28.

Bracing the members 32 and 33 are auxiliary compression members 36 and 37, and 38 and 39, respectively, and king post members 40 and 41 and 42 and 43, respectively. Members 32, 36, 37, 40 and 41 form one section having a knee piece 44 and members 33, 38, 39, 42 and 43 form a second section having a knee piece 45. The second section is braced and spaced from the first section by brace members 46, 47, 48, 49 and 50, and has a bend adjacent the knee 45 to provide room for wheel 35 and the tire 28.

It will be noted that the second section is preferably the section bent because it is the section on the side toward which the landing gear is retracted, and allows the bracket 72 to be placed at the lower edge of the airfoil 16 and the landing gear to be retracted into a position indicated by the dotted lines 51 within the airfoil sheltered from the relative wind. This gives the greatest clearance between the ground and the airfoil possible with this length strut. However, both of the sections may be bent to various degrees and the bracket 72 correspondingly located.

Mounted on the forward faces of strut 25 is a U-shaped member 52, secured thereto at its ends adjacent the lower ends of members 32 and 33 respectively. The member 52 is braced in place by brace members 53, 54 and 55 running to spaced points on members 32 and 33 respectively.

A connector, generally designated as 56 is adapted to be attached to any suitable type of retraction means such as a flexible cable (not shown). However, the retraction means may be connected elsewhere at other suitable points on the landing gear.

The knee 45 is shown enlarged in Figs. 6 and 7, the knee 44 being similar but having slightly different angles to its members as the knees are right and left-handed. The auxiliary compression member 37 has a plug 137 held in the end by screws 57. The plug 137 has threads on its projecting end and a semi-spherical seat in its end surface. The knee 45 has a semi-spherical seat and an opening 58 therein, and a ball member 59 is placed therein so that the ball may be attached to the auxiliary strut 27 by means of a shank 127, and the knee 45 is threaded to the plug 137. The knee 45 has integrally formed plugs 138, 143 and 149 projecting from the outer surface thereof which are attached to members 38, 43 and 49 respectively, in a manner similar to the attachment of plug 137 to the member 37.

By reason of the balls 59 on the ends of auxiliary struts 26 and 27 being swiveled in all directions in sockets in the knees 44 and 45, universal joints are provided between the main and both auxiliary struts.

The bracket 23 is secured to the spar 21, as shown on an enlarged scale in Fig. 8, and has outstanding arms 60 and 61 which support a pivot pin 62. Pivoted to the bracket 23 by means of the pivot pin 62 is an intermediate member 63, and pivoted to the member 63, by means of a pair of oppositely projecting gudgeons which may be formed integrally therewith, is the auxiliary strut 26. The axes of the pins 62 and of the gudgeons 64 are at right angles to each other, so that the parts 62, 63 and 64 form universal joint means, universally securing the auxiliary strut 26 to spar 21.

A plurality of brackets 63 are rigidly secured to the spar 21 and in turn rigidly support the guideway 24 in the form of a tubular curved track. A bracket 64, similar to the bracket 63, supports the distant end of the curved track 24 and is provided with a stop means for the end of the guideway. As shown in more detail in Fig. 5, auxiliary strut 27 has a bifurcated end 65, 66, forming a yoke, and pivoted in the yoke 65, 66 by means of gudgeons 67 and 68 is a cylindrical guide 69. The guide 69 has the gudgeons 67 and 68 formed integrally therewith and projecting from the outer surface thereof.

The guide 69 closely fits the guideway 24 and has a slot 70 to provide for its passage over the brackets 63. The bracket 63 has a web portion 71 disposed at an angle suitably predetermined and chosen to allow the member 69 to pass along the track 24, as the web 71 will pass through the slot 70. The stop bracket 64, however, is so formed that the guide member 69 will not come off the end of the track because the web of bracket 64 will not pass through the slot 70. The slot 70 is wider than the web 71 so as to allow for rotative movement on track 24 when the shock absorber 83 telescopes during landing.

The operation of this device is as follows:

Any time, after leaving the ground, that the pilot in the airplane shown in Fig. 1 wishes to retract his landing gear, to enable his plane to operate faster and more efficiently, he operates any suitable type of retracting mechanism (not shown) and draws the landing gear up into the airfoil.

During this retraction, the tire 28, as shown in Fig. 4, passes upwardly and rearwardly in the direction shown by the arrow through a succession of intermediate positions designated by the dotted line 72 into a final position inside the airfoil such as the dotted line position designated 51.

Due to the particular linkage of the three structure members, and their universal joint connections together and to the spars, and due to the particular shape of the curved trackway and the guiding influence exercised by the strut 27 on the other struts, the landing gear is caused to fold by a compound pivoting movement upwardly and backwardly compactly into the interior of the airfoil 16.

It will be noted that when the landing gear is in extended or land contacting position, that the strut 27 is substantially perpendicular to the trackway 24 which provides means for bracing the landing gear, as any forces that tend to collapse the landing gear are perpendicular to any possible movement of the strut 27 on the guideway 24. It will also be noted from Fig. 2 that the struts 26 and 27 are braced against the spar 21 and converge equally to the point where they join the main strut 25, the same being true in Fig. 4, and in Fig. 3 it will be noted the main strut 25 is almost vertically disposed while the auxiliary struts 26 and 27 are at a considerable angle to the ground and are adapted to move freely to a certain extent radially around their supports 23 and 24.

This throws the major shock of landing upon the main strut 25 where it is absorbed by the shock absorber 83.

While the aircraft 11 chosen for the purpose of illustration is a low-wing tractor monoplane with a single radial engine, my invention is obviously adapted to be used in conjunction with any airfoil, or other substantial part, of any type of aircraft and is not limited merely to the particular type shown in the drawings.

Landing gears employing various types of land contacting portions may be used, as while for purpose of illustration I have shown a landing gear in which the ground contacting portion is a pneumatic tire 28, my invention however is obviously adapted to be used in conjunction with other types of ground contacting elements.

The words "ground contacting portions" as used throughout the specification and claims is regarded as including landing gear elements adapted to contact with the surface of water or of snow as pointed out in the preceding paragraphs.

While I have shown in the drawings a particular illustrative form of my invention, various modifications may be made in the same and in the various features of construction, without materially changing the invention therein, and formal changes may be made in the specific embodiment of the invention disclosed without departing from the spirit or substance of the broad invention, the scope of which is commensurate with the appended claims.

I claim:

1. The combination with an aircraft having an airfoil of a landing gear having a main strut retractable therein, a universal type joint connecting said airfoil and the main strut of said landing gear, a curved guideway on said airfoil and means to brace and guide the motion of said main strut relative to said airfoil comprising two secondary struts universally connected to said main strut, one of said secondary struts forming a sliding pair with said curved guideway and the other of said secondary struts having a universal joint connection to the said airfoil, whereby the main strut is guided and braced.

2. In an aircraft, a frame, a retractable landing gear having in combination with the frame a universal joint, a main strut swung on said universal joint, a ground contactor member on said main strut, two secondary struts, ball and socket means between said secondary and said main struts, a second universal joint and a curved guideway on said frame, one of said secondary struts being swung on said second universal joint and the other of said secondary struts forming a sliding pair with said curved guideway on said frame.

3. An airfoil for an aircraft having in combination a pair of spars, a landing gear unit comprising a main strut, a ground contacting member connected to one end of said main strut, a universal joint on one of said spars, the other end of said main strut being connected to said universal joint, a pair of bracing struts, one end of both of said bracing struts being swiveled to said main strut, a second universal joint on the other of said spars, the other end of one of said bracing struts being universally borne by said second universal joint, a curved guideway on said other spar, and a member pivoted to the other end of said other bracing strut movable along said guideway.

4. An aircraft having in combination a pair of wing spars, a landing gear unit mounted on said spars comprising a main strut, a landing contacting portion on said main strut, a pair of auxiliary brace struts, said main strut and said brace struts forming a three point suspension for said land contacting portion, said struts all cooperating with each other and with said spars, a curved guideway on one of said spars, and one end of one of said auxiliary struts cooperating with said guideway to fold said landing gear unit between said spars.

5. An aircraft having in combination a pair of spars, a landing gear unit mounted on said spars comprising three struts cooperatingly forming a tripod, a ground contacting portion on the apex of said tripod, spar engaging means at the base of said tripod for each strut, one of said spar engaging means comprising a curved sliding pair.

6. An aircraft having in combination a pair of spars, a landing gear unit mounted on said spars comprising three struts cooperatingly forming a tripod, a ground contacting portion on the apex of said tripod, spar engaging means at the base of said tripod for each strut, two of said spar engaging mean comprising swivel connections between said struts and said spars, a curved guideway on one of said spars, the third of said spar engaging means comprising a member on said third strut movable along said curved guideway.

7. An aircraft having in combination an airfoil and a landing gear retractable therein comprising a collapsible tripod having a ground contacting apex, mounts for the base of said tripod on said airfoil, said tripod being secured by said mounts to said airfoil, one of said mounts comprising a pivotally mounted shock absorbing means and a universal connection secured thereto and another of said mounts comprising a curved sliding pair.

8. An aircraft having in combination a landing gear, said landing gear having a retracted position sheltered from the relative wind and an extended landing position, said landing gear comprising a tripod foldable from said retracted position to said landing position, a curved guideway on said aircraft, one leg of said tripod moving along said curved guideway, the longitudinal axis of said leg and a tangent to said guideway at the point of contact of said leg therewith in the extended landing position being substantially perpendicular.

9. An aircraft having in combination a retractable landing gear, said landing gear having a retracted position and an extended position, said landing gear comprising a ground contacting member, a main strut connecting said ground contacting member and said aircraft, a second strut connecting said main strut and said aircraft, and means comprising a guideway on said aircraft, and a third strut movable along said guideway and connecting said main strut and said guideway to limit the motion of said landing gear from said retracted position to said extended position, said third strut and said guideway being substantially perpendicular in said extended position whereby said landing gear is braced in said extended position.

10. The combination with an aircraft having an airfoil, of a landing gear having a main strut retractable therein, a fluid pressure shock absorber pivotally connected to said airfoil and the main strut of said landing gear, a guideway on said airfoil and means to brace and guide the motion of said main strut comprising two auxiliary struts universally connected to said main strut and a guideway operatively connected to one of the struts whereby the main strut is guided and braced.

11. An aircraft having, in combination, a retractable landing gear, said landing gear having a retracted position and an extended position, said landing gear comprising a front main strut, a pair of divergent, rear, auxiliary struts connecting said main strut and said aircraft and means comprising a curved guideway on said aircraft, said guideway being operatively associated with one of said auxiliary struts for limiting the motion of said landing gear from said retracted position to the extended position.

GERARD VULTEE.